(12) United States Patent
Wyatt

(10) Patent No.: US 6,188,053 B1
(45) Date of Patent: Feb. 13, 2001

(54) HEAT RETENTIVE SERVER

(75) Inventor: Burk Wyatt, Brentwood, TN (US)

(73) Assignee: Aladdin Temp-Rite, LLC, Nashville, TN (US)

( * ) Notice: Under 35 U.S.C. 154(b), the term of this patent shall be extended for 0 days.

(21) Appl. No.: 09/298,338

(22) Filed: Apr. 23, 1999

(51) Int. Cl.[7] .................................................. H05B 6/12
(52) U.S. Cl. ............................................. 219/620; 126/400
(58) Field of Search ................................... 219/620, 621, 219/730; 126/246, 400; 200/592; 436/155; 99/342; 137/217

(56) References Cited

U.S. PATENT DOCUMENTS

| 4,086,907 | * | 5/1978 | Rothschild | 126/246 |
|---|---|---|---|---|
| 4,162,741 | * | 7/1979 | Walker et al. | 220/203.05 |
| 4,982,722 | * | 1/1991 | Wyatt | 126/400 |
| 5,603,858 | | 2/1997 | Wyatt et al. | |
| 5,611,328 | | 3/1997 | McDermott | |
| 5,786,643 | | 7/1998 | Wyatt et al. | |

* cited by examiner

Primary Examiner—Teresa Walberg
Assistant Examiner—Quang Van
(74) Attorney, Agent, or Firm—Ohlandt, Greeley, Ruggiero & Perle, LLP

(57) ABSTRACT

A heat retentive server that has an outer peripheral member, a central portion having a heat storage member susceptible to heating by induction, wherein the outer peripheral member does not contact the heat storage member. Preferably, the outer peripheral member is formed from polypropylene. The present invention also involves method of manufacture aspects of such a heat retentive server.

15 Claims, 8 Drawing Sheets

HEAT RETENTIVE SERVER

FIELD OF THE INVENTION

The present invention relates to a heat storage dish, particularly a heat retentive server adapted to be heated by induction. More particularly, the present invention relates to novel transportable heat retentive server. The present invention also relates to a method of manufacturing such a heat storage dish.

BACKGROUND OF THE INVENTION

In environments where food is prepared and cooked in a central location and distributed and served to consumers who are remotely located, such as in hotels, aircraft and institutional settings such as hospitals and nursing homes, there is often a delay between the time that the food is prepared, cooked and subsequently placed on a plate or other serving dish, and the time that the food is eventually presented to the consumer for consumption at a remote location. Accordingly, by the time the food is presented to the consumer, the food can become cold unless special measures are taken to keep the food hot. Various approaches have been employed by delivery system manufacturers in an effort to solve the problems associated with remote delivery of meals, sometimes referred to as "satelliting."

U.S. Pat. No. 5,611,328 to McDermott discloses a heat retentive service base that is inductively heated. The McDermott patent discloses a heat retentive service base formed by insert molding. In the McDermott insert molding process, the heat retentive core is held in the molding position by several pins. The pins are received in apertures disposed in the core. While the core is held in place, the liquid plastic is introduced around the core to form the service base. A central bore in the core holds the core in place and allows the liquid plastic to flow to the back side of the core for encasing the core within the service base and form a wall that becomes the service base bottom. Thereafter, the pins are removed from the service base. Plastic plugs that fit into the core and base apertures are ultrasonically welded to the bottom of the base.

One disadvantage of the McDermott base results from the need for high heat resistant plastic for the formation of the entire outer plastic portion of the base. Such high heat resistant plastic, such as a Radel® or Ultem®, are substantially more expensive than most polypropylene plastics.

U.S. Pat. Nos. 5,603,858 and 5,786,643 to Wyatt et al. (hereinafter "the Wyatt et al. patents"), the disclosures of which are incorporated herein in their entirety, disclose a transportable heat retentive server that is adapted to be inductively heated. According to the Wyatt et al. patents the heat retentive server has central dish receiving portion that has an annular opening at its periphery between its upper and lower generally disk-shaped members. This Wyatt et al. server also has an outer peripheral member that has a hooked-shaped member that is received in the annular opening between the upper and lower generally disk-shaped members.

It has been found that the plastics used to form certain prior art inductively heated heat retentive servers exhibit degradation due to repeated exposure to chemicals, such as surfactants, used during the warewashing rinse cycle. As a result, such heat retentive servers exhibit cracking in the exterior, which allows water to compromise the interior of the heat retentive server. Such water-compromise can be particularly dangerous due to the rapid heating of the base achieved by induction heating. Water that compromises the interior and comes into intimate contact with the ferromagnetic heat retentive disk rapidly vaporizes upon induction/activation causing in some cases the heat retentive server to explode.

One novel solution to the above-described compromise of the interior of the heat retentive server is described in copending application Ser. No. 08/892,059 (Wyatt) for Pressure Relief System for Inductively Heated Heat Retentive Server, the disclosure of which is incorporated herein as if set forth in its entirety. However, the pressure release valve adds significantly to the cost of manufacturing a heat retentive server. In addition to the cost of the parts, each pressure release valve must be tested after the valve has been incorporated into the heat retentive server. The additional time and labor adds significantly to the cost of manufacturing the heat retentive server. In addition, the pressure release valve only provides a safety mechanism in the event that water compromises the interior of the heat rententive server. While such a safety mechanism is important, ideally, it is preferable that water is prevented from compromising the interior of the heat retentive server in the first place.

There remains a need for a heat retentive server that (1) is susceptible to rapid heating through induction, (2) provides improved resistance to water-leakage into the interior of the serving base, (3) is forgiving if accidentally stacked one upon another after having been heated, (4) is lighter in weight, and (5) has a lower manufacturing cost than prior art inductively heated heat retentive servers. The present invention also provides many additional advantages, which shall become apparent as described below.

SUMMARY OF THE INVENTION

The present invention, in brief summary, is a heat retentive server that has an outer peripheral member, a central portion having a heat storage member susceptible to heating by induction, wherein the outer peripheral member does not contact said heat storage member. Preferably, the outer peripheral member is formed from polypropylene.

The present invention also involves method of manufacture aspects, which are discussed in more detail below.

Further objects and features of the present invention will be apparent from a review of the following specification including the drawings, wherein like parts have been given like numbers.

BRIEF DESCRIPTION OF THE DRAWINGS

FIG. 4A is a partial cross-sectional of the heat retentive server illustrated of FIG. 4 further including a pressure release valve;

DETAILED DESCRIPTION OF THE PREFERRED EMBODIMENTS

Figure 1:
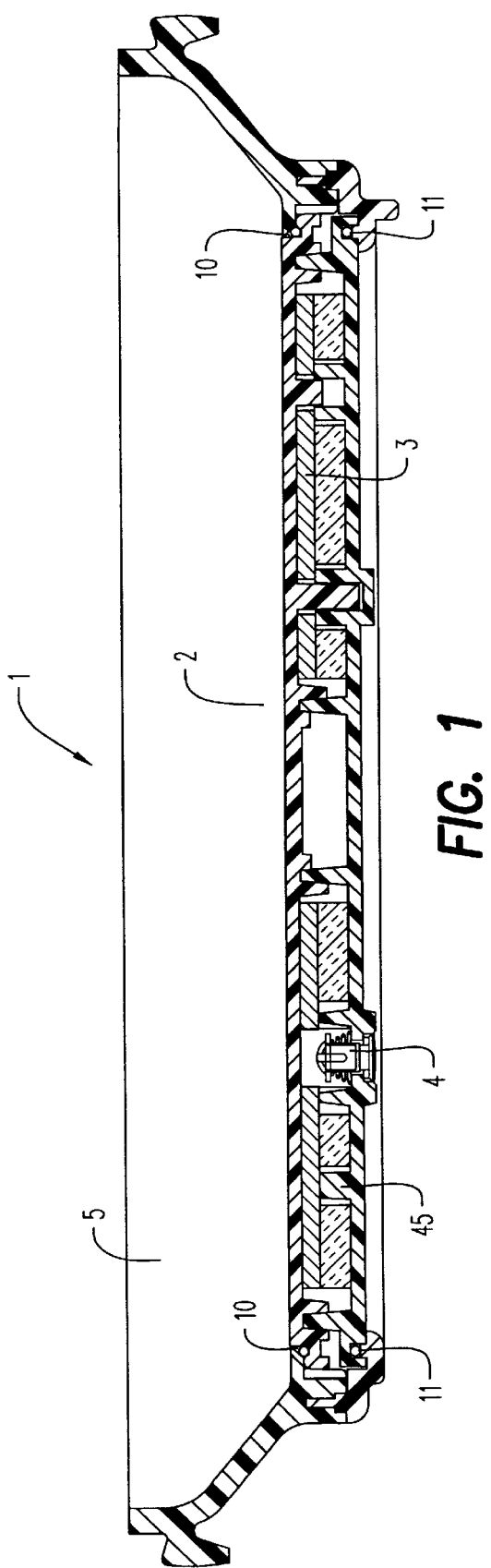
FIG. 1 is a cross-sectional view of the preferred embodiment of the heat retentive server according to the present invention.

FIG. 1 is a schematic representation of the cross-section of a heat retentive server of the present invention, generally designated as 1, in transverse cross-section. The heat retentive server of this embodiment comprises a central portion generally designated as 2. The heat retentive server illustrated in FIG. 1 has a pressure release valve, generally 4, (disclosed in copending application Ser. No. 08/892,059, discussed above, and incorporated herein in its entirety).

Figure 2:
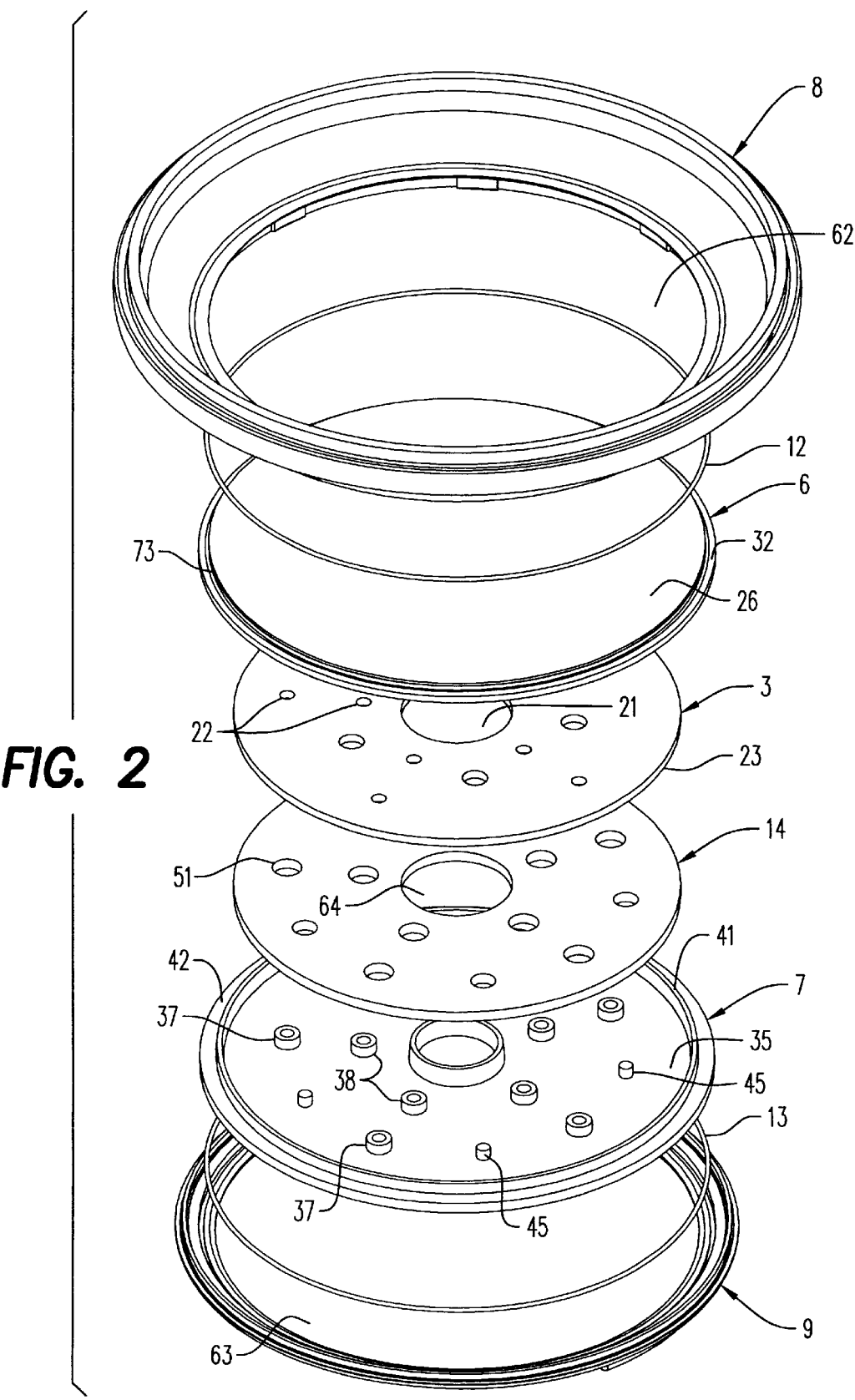
FIG. 2 is an exploded view of the heat retentive server shown in FIG. 1 while in the upright position.
Figure 3:
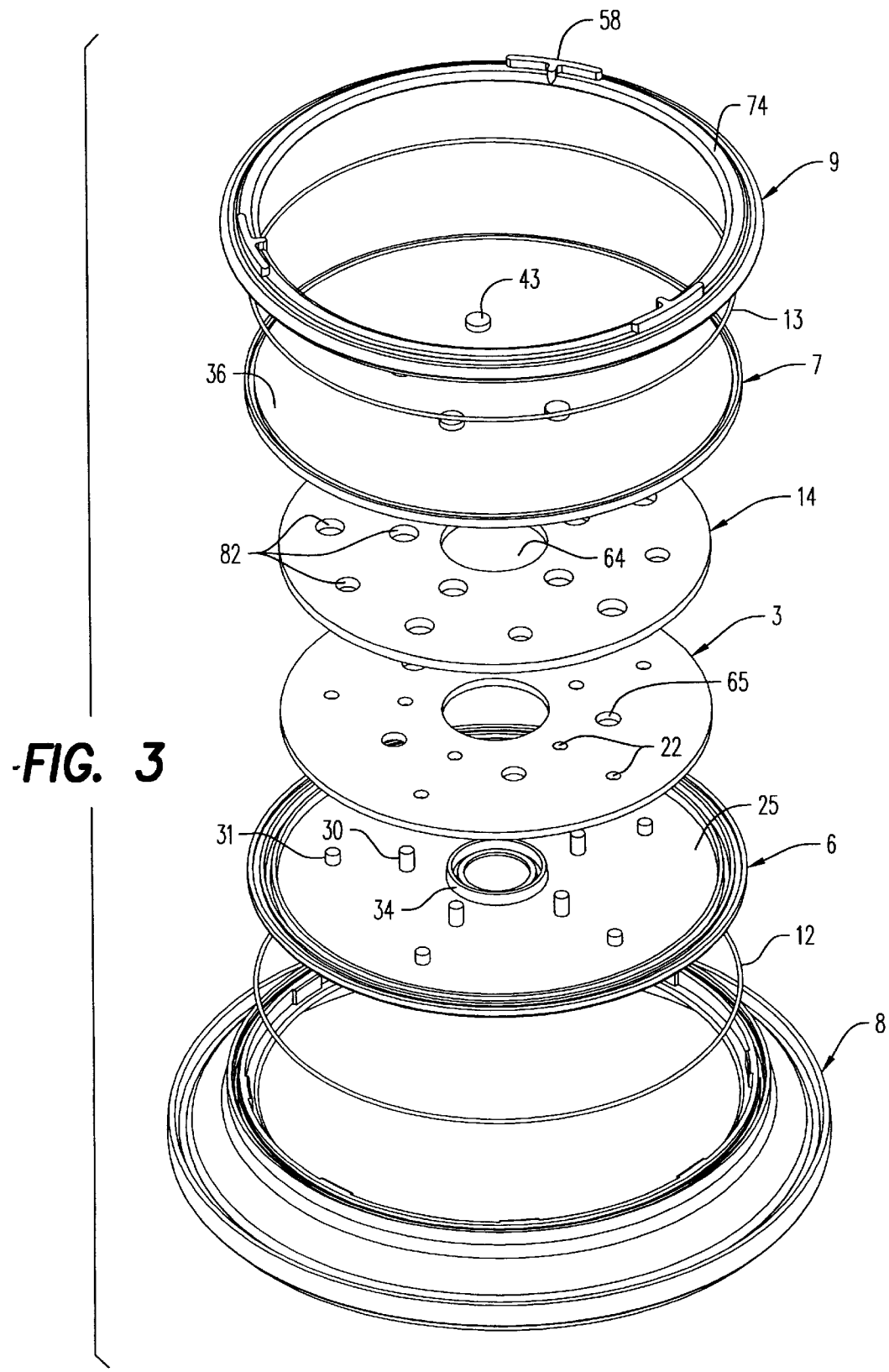
FIG. 3 is an exploded view of the heat retentive server of FIG. 1 while in the inverted position.

As illustrated in FIGS. 1, 2, and 3, the heat retentive server is generally bowl-shaped. However, the shape of the heat retentive server can be modified by those in the art to other shapes, such as rectangular. The dish-holding interior, generally 5, of the heat retentive server is of a size and shape to accommodate a typical institutional food serving dish having heated food placed thereon. The central portion has a heat storage member 3 disposed between an upper member, generally 6, and a lower member, generally 7. The heat retentive server has an outer peripheral member comprised of an upper peripheral member, generally 8, and a lower peripheral member, generally 9. The heat retentive server has two sealant cavities. The first sealant cavity 10 is located between the upper peripheral member and the upper member. The second sealant cavity 11 is located between the lower peripheral member and the lower member. The sealant cavity is filled with a sealing composition or compound. Preferably, the sealing compound is an O-ring gasket. An upper O-ring gasket 12 is positioned in the first sealant cavity. A lower O-ring gasket 13 is positioned in the lower sealant cavity. The heat retentive server has a heat directing layer, generally 14, disposed between the heat storage member 3 and the lower member 7.

FIG. 2 is an exploded view of the preferred heat retentive server of the present invention illustrating the relative vertical placement of the lower peripheral member, the lower O-ring gasket 13, the lower member generally 7, the heat directing layer generally 14, the heat storage disk generally 3, the upper member generally 6, the upper O-ring gasket 12, and the upper peripheral member generally 8. FIG. 3 is an inverted view of the preferred heat retentive server illustrated in FIG. 2.

The heat storage member is formed from steel. It is preferred that the heat storage member is formed from cold rolled steel. It is also preferable that the cold rolled steel has a carbon content from about 0.04 to about 0.08%. Although the heat storage member may be formed from other materials that are susceptible to heating by induction, it is preferred that the heat storage member is formed from a ferro-metallic material. The heat storage member is preferably circular in shape. However, the shape of the heat storage member may be modified by those in the art according to the type and shape of the server. However, when the heat retentive server is bowl-shaped with a generally disk-shaped central portion, the heat storage member is preferably circular and disk shaped.

The upper member and the lower member are formed from a high-heat resistant material. The high-heat resistant material must be able to maintain its integrity up to temperatures of 425° F. For embodiments in which the upper and lower members are ultrasonically welded, preferred materials are those which can be ultrasonically welded, but which are also heat resistant. Suitable high-heat resistant materials can be selected by those of ordinary skill in the art. Non-exclusive examples of such suitable high-heat resistant materials include MINDEL glass filled resin available from Amoco of Atlanta, Ga., and ULTEM glass filled resin, available from General Electric, of Pittsfield, Mass. Preferably, the high-heat resistant materials are glass filled. Glass-filled materials are preferred because glass adds the following properties to heat resistant materials: (1) increased heat resistance, increased chemical resistance, and (3) greater stiffness. The preferred high-heat resistant material is available under the tradename RADEL and is available from Amoco, of Atlanta, Ga.

The central portion of the heat retentive server also has a heat-directing layer, generally 14, disposed between the heat storage member and the lower member. The heat-directing layer provides an insulating layer between the heat storage member and the lower member. The location of the heat-directing layer, directs the dissipation of heat after activation of the heat storage member by induction heating toward the upper member and interior of the heat retentive server where the food is located. The heat-directing layer substantially decreases the radiation of heat toward the lower member. The radiation of heat toward the lower member is undesirable because food servers and others might accidentally contact the lower member while handling of the heat retentive server after its activation by induction heating. In addition, radiation of heat toward the lower member is unnecessary.

The heat-directing layer is preferably formed from fiberglass material. Fiberglass is a preferred material because it has absorption properties in addition to insulating properties. Thus, in the event that water or other fluids (collectively referred to herein as "water") compromise the interior of the central portion, fiberglass material absorbs the water into its interior and away from the heat storage member. If water is prevented from contacting the heat storage member during and after activation, the likelihood of rapid vaporization of the water into explosive steam is substantially decreased. Fiberglass is also a preferred material because it provides absorption, heat directing, insulating properties without substantially increasing the overall weight of the heat retentive server. A preferred fiberglass material is MANNIGLAS 1200 and is available from S&S Industry of Mt. Juliet, Tenn.

The outer peripheral member is formed from polypropylene. Polypropylene has been found to resists chemical degradation. Since the heat retentive servers are often used in institutional settings, such as nursing homes and hospitals, the heat retentive servers are exposed to repeated washings. In most institutional settings, the washing of food service items, such as trays and silverware, includes exposure to (1) strong detergents during the washing cycle, (2) surfactants during the rinse cycle, and (3) heat during the drying cycle. As discussed above, repeated exposure to the surfactants during the rinse cycle can cause some plastics to degrade and crack. The cracking of the exterior may allow water to compromise the interior of the heat retentive server, which is undesirable for the reasons discussed above. The repeated exposure to heat during the drying cycle, which occurs subsequent to the cleaning cycle, also exacerbates chemical degradation.

In addition to the reason set forth above, polypropylene is also a preferred material because it is relatively inexpensive and is also lightweight. Thus, the formation of the outer peripheral member from polypropylene provides a relatively lightweight, longer lasting heat retentive server that may be manufactured for a lower cost than prior art inductively heated heat retentive servers.

Because of the function of the heat retentive server, it is preferred that the material used to form the upper member 6, the lower member 7, the upper peripheral member 8 and the lower peripheral member 9 are food-grade as would be evident to those in the art. When the heat retentive server of the present invention is used to serve food, the upper member 6 and the upper peripheral member 8 is preferably formed from food-grade material.

The sealing composition is present to prevent water from penetrating to the interior of the heat retentive server through the joint between the central member and the outer member. In the heat retentive server of the present invention, the sealing composition is inserted into the first sealing cavity and the second sealing cavity. Suitable sealing compositions can be selected by those of ordinary skill in the art. The sealing composition should be hydrophobic, capable of maintaining its integrity up to temperatures of 200° F., resistant to detergents and surfactants, and compressible to form a water-tight seal. The sealing composition of the present invention is the form of and O-ring gasket and is formed from nitrile. The nitrile preferably has a durometer from about 30 to about 70. The durometer of the nitrile affects the compression properties of the nitrile, which in turn affect the seal obtained. Nitriles having a durometer much less than 30 are often too soft, whereas nitrites having a durometer greater than 70 are often too hard. A suitable example is nitrile with 50 durometer [Shore A] available from Molding Solutions in Lexington, Ky.

Figure 4:
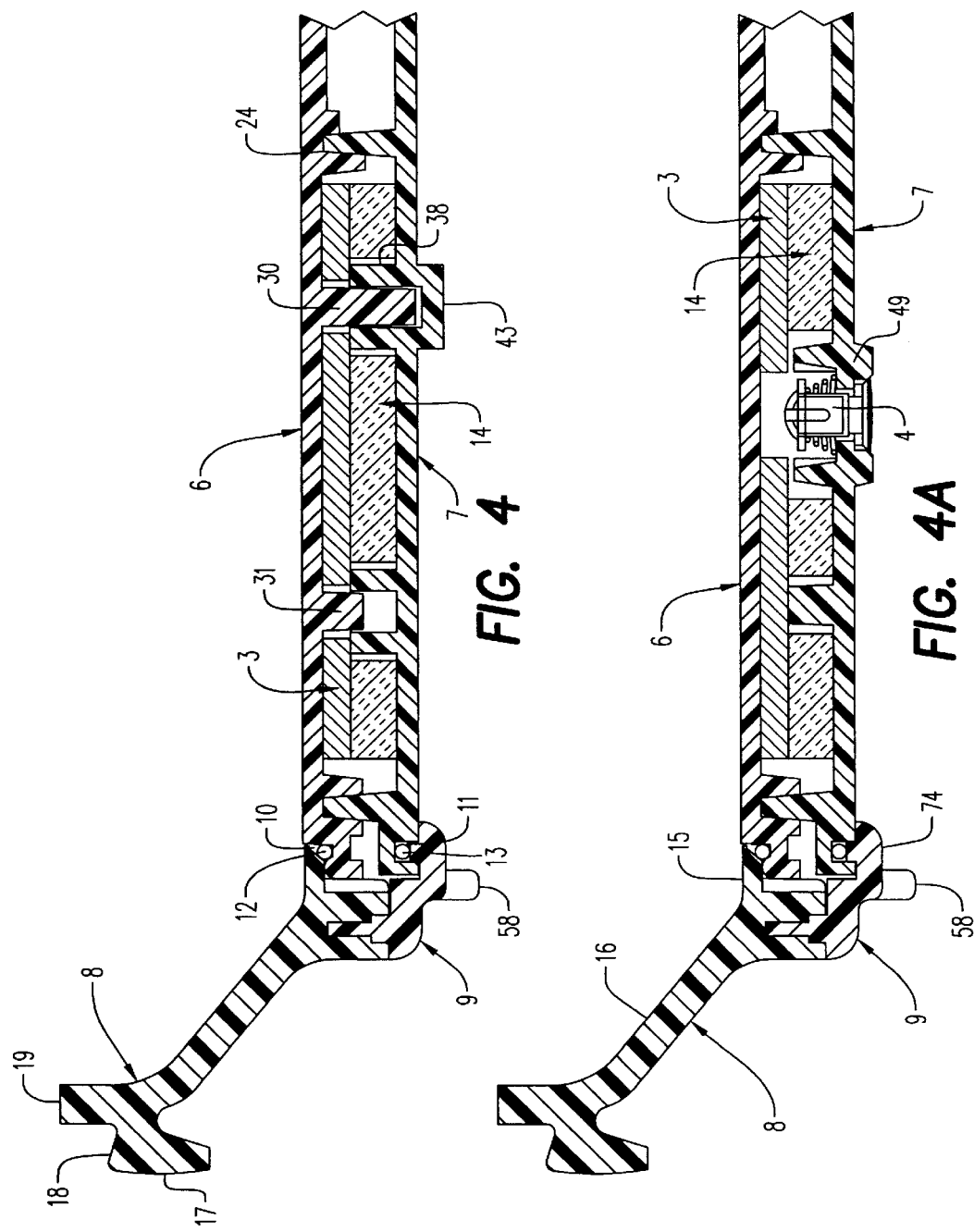
FIG. 4. is a partial-sectional view of the heat retentive server of FIG. 1.
Figure 5:
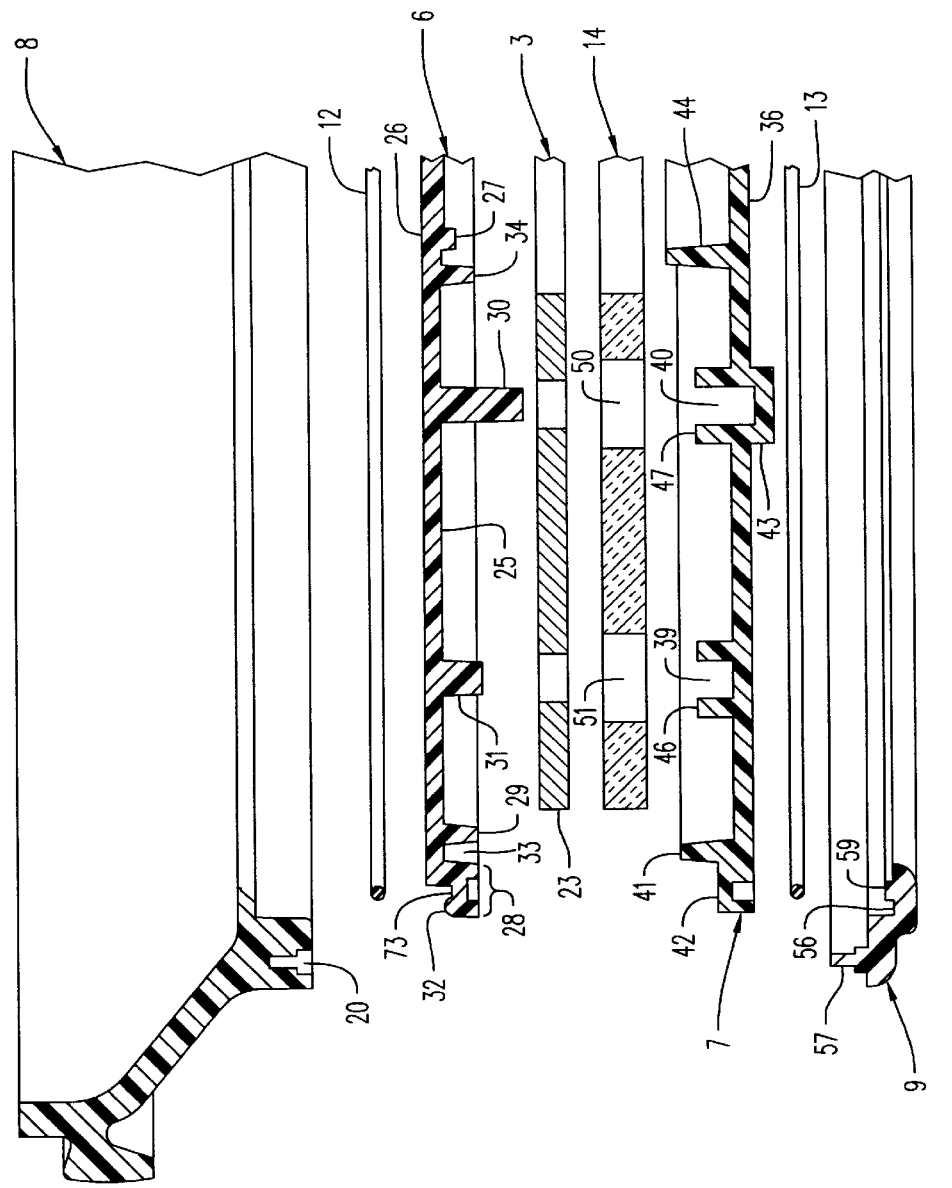
FIG. 5 is a partial cross sectional exploded view of the heat retentive server of FIG. 4.

FIG. 4 is an enlarged partial cross section of the heat retentive server illustrated in FIG. 1. FIG. 4A is the heat retentive server illustrated in FIG. 4 having a pressure relief valve 4. FIG. 5 is an exploded view of the heat retentive server of FIG. 4. The process of forming the heat retentive server is described below with reference to the drawings.

The heat storage member 3 is circular. The heat storage member has a central aperture 21. The heat storage member also has positioning apertures 22. The positioning apertures are located in the heat storage member to maximize balance about the physical center of the heat storage member. As illustrated in FIGS. 2 and 3, preferably the positioning apertures radiate from the central aperture and are aligned in a concentric manner with respect to the central aperture 21 and the outer circumference 23 of the heat storage member.

The heat storage member is formed from hot rolled or cold rolled steel to form a metal disk. It has been found that preferred results are obtained by optimizing a combination of mass of the metal disk, the diameter of the metal disk, the thickness of the metal disk, as well as the number of apertures and diameter of apertures which are present in the metal disk. Preferably, the metal disk has a mass of from about 450 grams to about 475 grams, an outer diameter of about 6.4 inches to about 6.6 inches. Most preferably the metal disk has a diameter of about 6.5 inches. It is preferred that the thickness of the metal disk is about 0.117 inch to about 0.125 inch. The metal disk has from about eight to about twelve, more preferably ten, positioning apertures 22, which are preferably generally round in top plan view. The metal disk also has from three to seven, more preferably five apertures 65 positioned equidistantly, in order to maintain balance, about the central aperture 21 of the metal disk. Apertures 65 decrease the weight of the heat storage member and, thus, the overall weight of the heat retentive server. Apertures 65 also decrease the amount of steel required to form the heat retentive member, and, decrease the cost of making the heat retentive server. As will be discussed below, the central aperture 21 allows the formation of a central annular weld 24 joint between the upper member 6 and lower member 7 illustrated in FIGS. 1, 4, and 4A. The function of positioning apertures 22 of the heat retentive member will be discussed further below.

Figure 7:
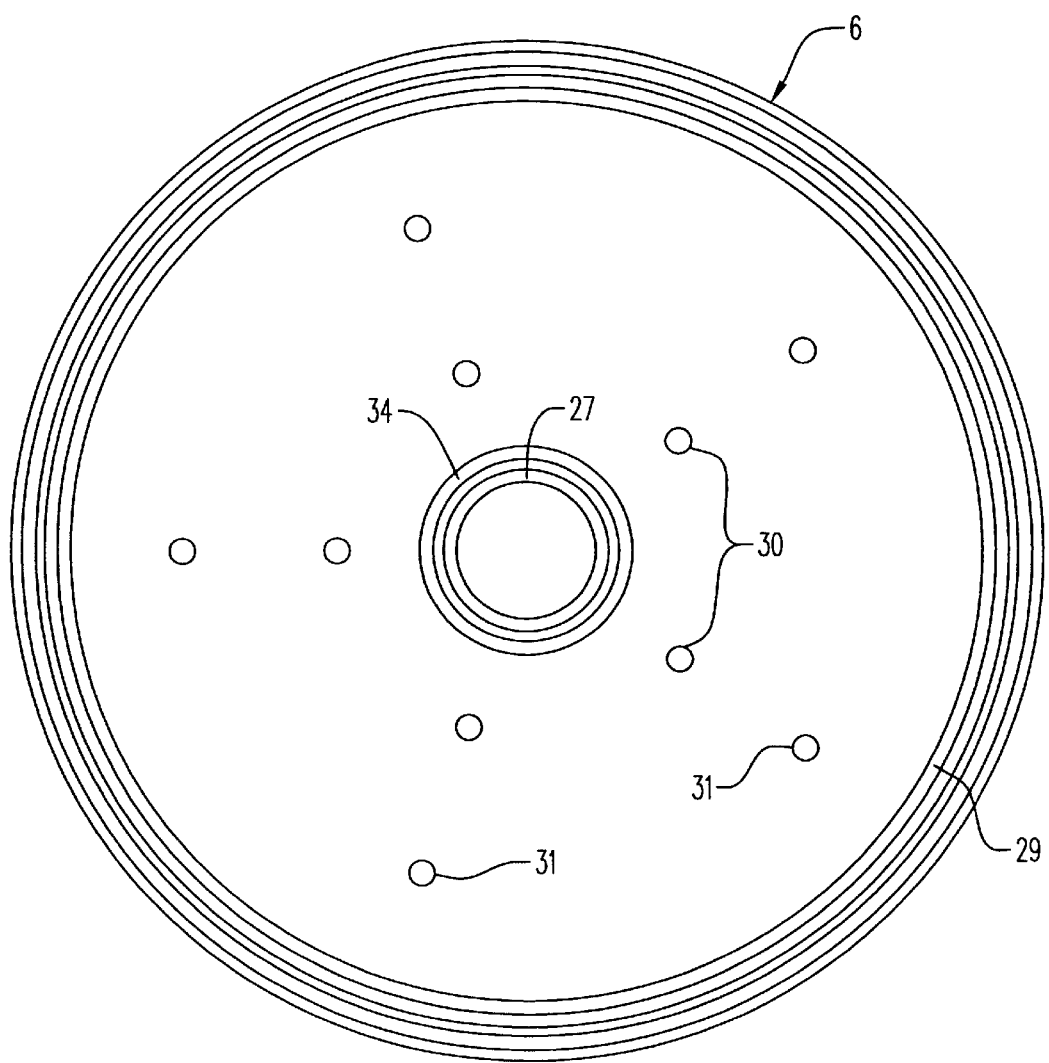
FIG. 7 is a top plan view of the internal surface of the upper member of the central portion of the heat retentive server of the present invention.

The upper member 6 has an internal surface, generally 25, and an external surface, generally 26. The internal surface 25 has an inner central annular ridge 27, an outer central annular ridge 34, an outer annular rim 28 and an outer annular ridge 29. Between the outer annular rim 28 and the outer annular ridge 29 an outer annular groove 33 is provided. The internal surface has extending substantially perpendicularly therefrom positioning posts 30 and truncated positioning posts 31. As illustrated in FIG. 7, it is preferable that positioning posts 30 are located proximate to the circumference of the outer central annular ridge 34 and that truncated positioning posts 31 are located proximate the outer annular ridge 29. Both the positioning posts 30 and the truncated positioning posts 31 should be equidistantly spaced in a circular pattern around the center of the upper member in a top plan view. In the preferred embodiment, there are five positioning posts 30 and five truncated positioning posts 31. However, the number of positioning posts 30 and truncated positioning posts 31 may be adjusted by those in the art with consideration of the following factors: mass of the steel disk, the ductile properties of the heat resistant material used to form the lower member, and the thickness of the lower member. The external surface 26 of the upper member has an outer annular shoulder 32 having an inner annular groove 73. It is preferred that the positioning posts 30 and the truncated positioning posts 31 are positioned on the upper member symmetrically in a circular pattern about the center of the upper member in order to maximize balance.

The lower member 7 also has an internal surface, generally 35, and an external surface, generally 36. The lower member has truncated posts receptacles 37 and positioning posts receptacles 38, both extending substantially perpendicularly from the internal surface 35. The receptacles 37, 38 are preferably round in a top plan view. Each truncated post receptacle 37 has a central bore 39 that is also preferably round in a top plan view. Each positioning post receptacle 38 also has a central bore 40 that is also preferably round in a top plan view. Each central bore 39 create a ledge 46 at the upper end of each receptacle 37. Each central bore 40 creates a ledge 47 at the upper end of each receptacle 38.

Figure 8:
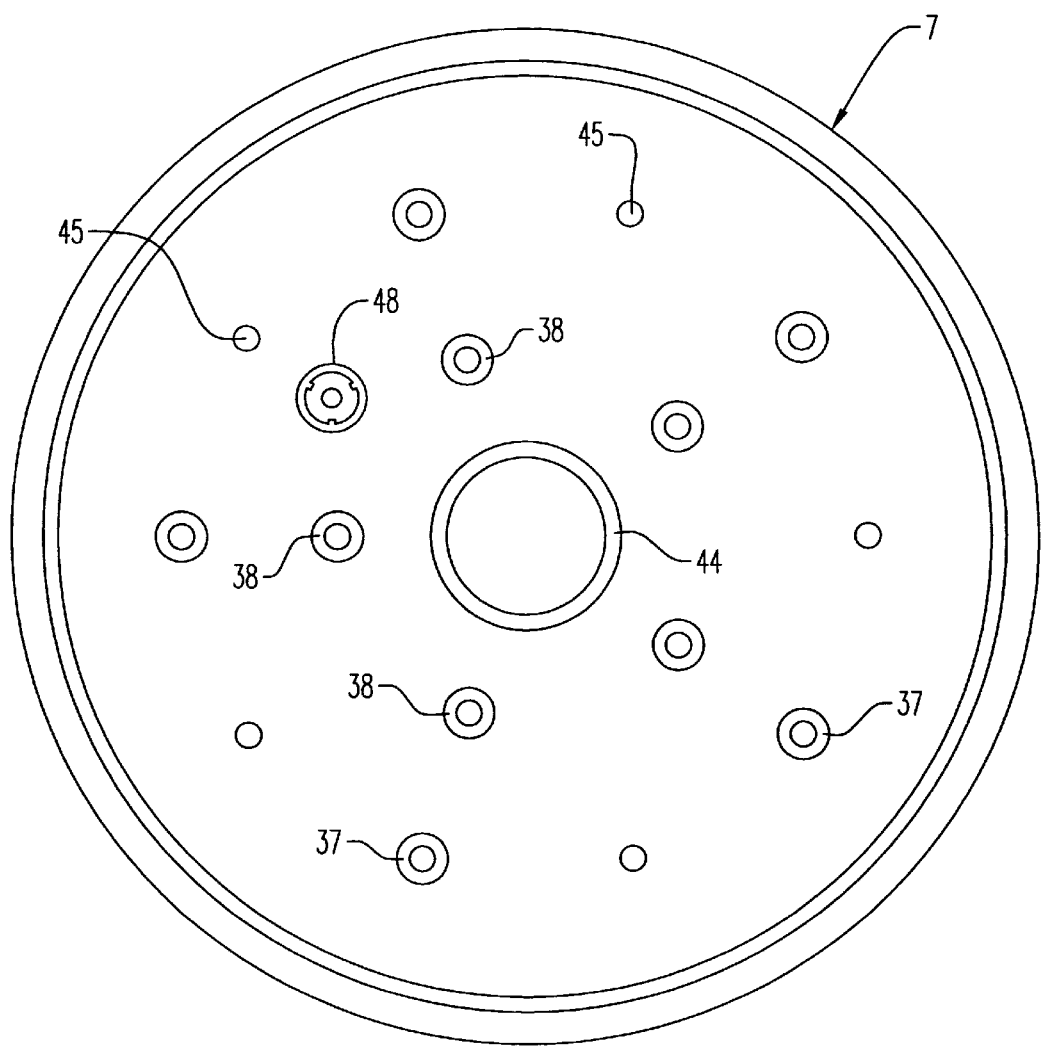
FIG. 8 is a top plan view of the internal surface of the lower member of the central portion of the heat retentive server of the present invention.

The internal surface 35 also has an outer annular ridge 41 and an outer annular ledge 42. The lower member 7 also has a central annular ridge 44 extending substantially perpendicular from the internal surface 35. The lower member 7 also force dissipating posts 45 (FIGS. 1 and 2) extending substantially perpendicularly from the internal surface 35. As illustrated in FIG. 8, receptacles 37, 38 and force dissipating posts 45 are located in equidistantly in a circular pattern about the center of the upper member in a top plan view. It is preferred that the posts 45 and receptacles 37, 38 are positioned in a symmetrical pattern about the physical center (in a top plan view) in order to maximize balance. The external surface 36 of lower member has an outer annular groove 55. When the heat retentive server has a pressure relief valve (FIG. 1 and 4A), the lower member has an aperture to accommodate the valve. It is preferred that the aperture for the pressure relief valve is positioned to minimize imbalance. In addition, when the lower member has the pressure relief valve and aperture, it is preferred that both the valve and, thus, the aperture is in the center of a receptacle 49, which is preferably circular in a top plan view of the lower member.

The upper peripheral member of the heat retentive server has an annular lower shoulder 15, an annular sloping plane 16, an annular external shoulder 17 having an upper shelf 18. The upper peripheral member may have a lip 19. When a cover, preferably a dome-shaped cover, is used with the heat retentive server the annular external shoulder, the upper shelf and the lip can cooperate with such a cover to prevent heat and moisture from escaping the insulated volume between the dome and the dish-holding interior of the heat retentive server. The upper peripheral member also has a central aperture 62. The upper peripheral member has a lower annular groove 20.

The lower peripheral member has an annular groove 56 and an upper annular ridge 57. The lower peripheral member has a lower peripheral ridge 74. It is preferred that the lower peripheral ridge has lower peripheral extensions 58 extending substantially perpendicularly therefrom. The lower peripheral member has a central aperture 63.

The heat retentive server is assembled as follows. The heat retentive member is placed on the internal surface of the upper member. Positioning posts 28 and truncated positioning posts 29 of the upper member extend through position apertures 22 of the heat retentive member. The outer central annular ridge of the upper member 6 extends through the central aperture 21 of the heat storage member. The outer circumference of the heat storage member nests within the outer annular ridge 29 of the upper member. The insulating/ heat directing layer 14 is positioned against the heat retentive member so that each positioning post 30 extends through corresponding aperture 50 in the insulating/heat directing layer and truncated positioning posts 31 align with apertures 51 in the insulating/heat directing layer. The insulating/heat directing layer preferably also has a central aperture 64 that accommodates the outer central annular ridge 34 of the upper member.

The lower member is then positioned such that the internal surface 35 is proximate to the insulating/heat directing layer 14. Each truncated post receptacles 37 extends into a corresponding aperture 51 in the insulating heat/directing layer. The central bore 39 of the truncated post receptacle accommodates the truncated post as illustrated in the insulating heat directing layer. Also as illustrated in FIG. 1, each positioning post receptacle central bore 40 accommodates the positioning post. The outer circumference of the insulating/heat directing layer nest within the outer annular ridge 41 of the lower member. When the heat retentive server is an upright position, heat retentive member rests on ledges 46, 47 and on the force dissipating posts 45. Since the heat retentive member is preferably formed from metal and is relatively heavy in weight in comparison to the plastic used to form the upper and lower members, it is important that heat retentive server have a mechanism to accommodate the force of the heat retentive storage member against the lower member if the heat retentive server should be dropped. It has been found that the providing ledges on each of the receptacles 37 and 38 and providing force dissipating posts 45 is very important preserving the integrity the heat retentive server in the event that the heat retentive server is accidentally dropped during use. The posts 45 and the receptacles 37, 38 dissipate the force of the heat retentive member. If there are not enough posts or receptacles provided and the heat retentive server is dropped, the force of the heat storage member against the lower member is concentrated at the posts and receptacles that are provided and the lower member may possibly crack. The greater the number of receptacles and posts, the greater the dissipation of force. It has been found that when the heat storage member weighs from about 450 to about 475 grams, it is preferred that the lower member has a total of twelve to sixteen force dissipating members. The force dissipating members are preferably either force dissipating posts 45 or receptacles 37, 38. In the preferred embodiment, there are fifteen force dissipating members provided by five force dissipating posts 45, five receptacles 37 and five receptacles 38.

The heat-directing layer 14 is formed from fiberglass. The preferred fiberglass material is MANNIGLAS 1200 and is available from S&S Industry of Mt. Juliet, Tenn. The heat-directing layer is disposed between the heat retentive storage member and the lower member in order to direct the heat toward the upper member and the dish holding interior 5. As discussed above, it is preferred that the heat-directing layer is formed from fiberglass for the following reason. It has been found that if water compromises the interior of the central portion, a fiberglass layer absorbs the water into its center, thus, preventing the water from contacting the heat storage member. This "wicking" action is particularly important since when water contacts the heat storage member during the inductive heating process, the rapid heat production causes the water to vaporize and the heat retentive server can burst. The force dissipating members 45, and the receptacles 37, 38, discussed above, also assist in wicking water away from the heat storage member. It is important to prevent the heat storage member from resting directly on the fiberglass layer. If the heat storage member were to rest on the fiberglass layer, the weight of the heat storage member, particularly if a steel/metal disk, would force water out of the center of the fiberglass layer into direct contact with the heat storage member. To accommodate the force dissipating members and receptacles, the fiberglass layer has apertures 82. As discussed above, during activation/heating of the heat retentive server, vaporization of water in direct contact with the heat storage member may cause severe cracking or explosion of the heat retentive server.

As stated above, a pressure release valve may also be incorporated into the lower member of the central portion of the heat retentive server to accommodate the formation of steam when water compromises the internal area of the central portion. Incorporating such a pressure release valve is less preferred because incorporating the pressure release valve increases the expense of producing the heat retentive server. Since the fiberglass layer also performs the insulating/heat directing function as well as a water absorption function, the incorporation of the fiberglass layer rather than the pressure release valve is more preferred. Incorporating both the fiberglass layer and the pressure release valve increases the expense of producing the heat retentive server. However, both the fiberglass layer and the pressure release valve may be incorporated into the heat retentive server so that each safety feature provides a backup for the other. When a pressure release valve is present both the fiberglass layer and the lower member has an aperture to accommodate the pressure release valve. One suitable position for such an aperture in the lower member is shown as 48 in FIG. 8.

The outer central annular ridge 34 and the inner central annular ridge 27 form a inner welding groove 52. The central annular ridge 44 of the lower member nests within the welding groove 52. The outer annular ridge 41 of the lower member nests in the outer welding groove 53 that is formed between the outer annular rim 28 and the outer annular ridge 29 of the upper member. The upper member is welded to the lower member at the inner welding groove 52 and the outer welding groove 53. It is preferred that the upper and lower members are welded by ultrasonic welding, however, other forms of welding may be used by persons skilled in the art. Welding procedures useful in the present invention are described in U.S. Pat. Nos. 5,603,858 and 5,786,643, which have been incorporated herein.

In the preferred embodiment, an upper O-ring gasket 12 is positioned on the external surface 26 of the upper member to nest in groove 33. Absent the upper O-ring gasket 12 groove 33 provides the first sealant cavity 10. However, the upper O-ring gasket positioned in the first sealant cavity assists in providing a more effective sealant cavity and in providing an expansion joint that is resistant to water penetration. The upper peripheral member is positioned so that the annular lower shoulder 15 extends and cooperates with the upper surface 54 of outer annular rim 28. The lower O-ring gasket is positioned in lower sealant cavity 11. Each positioning post receptacle extends into a corresponding aperture 50 outer external annular groove 55 of the lower member. The upper and lower O-ring gaskets 12, 13 are most preferably formed from nitrite with 50 durometer [Shore A]. The lower O-ring gasket is positioned in the outer external annular groove 55.

The outer circumference of the lower member 7 nests within the inner area formed by the upper annular ridge 57 and on the lower annular ledge 59 of the lower peripheral member. The lower annular ledge also has a lower ledge annular gasket groove 60. The lower ledge annular gasket groove assists in providing the second sealant cavity. In addition, the lower ledge annular gasket groove accommodates the lower O-ring gasket 13 in the preferred embodiment.

The upper peripheral member 8 and lower peripheral member 9 are positioned so that the outer circumference of the central portion 2 is disposed between the inner circumference of the upper and lower members. Preferably, a large portion of the external surface 25 of the upper member is positioned in the central aperture 62 of the upper peripheral member 8. It is also preferable that a large portion of the external surface 36 of the lower member is positioned in the central aperture 63 of the lower member. The upper annular ridge 57 of the lower peripheral member nests within the lower annular groove 20 of the upper peripheral member. The upper peripheral member is welded to the lower peripheral member where upper annular ridge 57 and the lower annular groove mate. The weld is preferably an ultrasonic weld as described above with respect to the inner and outer welding joints of the central portion. In addition, as discussed above, other types of welds may be substituted by those in the art.

Figure 6:
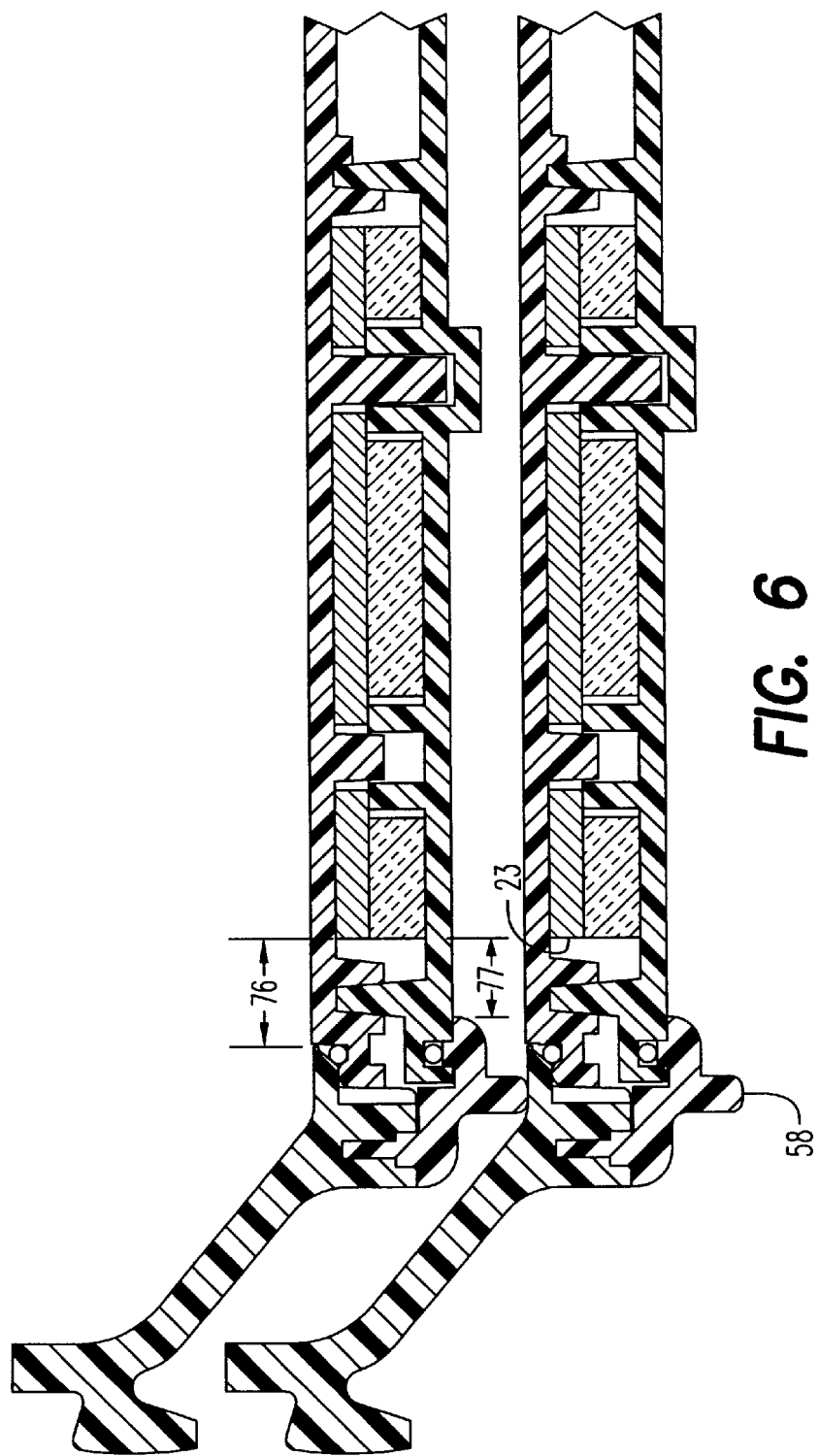
FIG. 6 is a partial cross-sectional view of two heat-retentive servers in a stacked relationship to one another.

Since the outer peripheral member is formed from polypropylene, it is important that the outer circumference 23 of the heat storage member is positioned a sufficient distance from the peripheral member. As seen in FIG. 6, the upper peripheral member is separated from the outer circumference of the heat storage member by distance 76, and the lower peripheral member is separated by distance 77.

As stated above, the lower peripheral member has a lower peripheral ridge or preferably lower extensions 58. As illustrated in FIG. 6, the lower extensions 58 are positioned so that when a first heat retentive server is stacked on a second heat retentive server, either the lower extension 58 or lower annular ridge 74 of the lower peripheral member of the first heat retentive server contacts the annular lower shoulder 15 of the second heat retentive server. Although it is preferred that the heat retentive servers are not placed in a stacked position after having been heated, the above-described positioning of the lower peripheral extensions 58 or lower peripheral ridge (not shown) assists in preventing damage to the heat retentive server if stacked after having been heated/activated.

Each heat retentive server can be activated/heated in the manner disclosed in the Wyatt et al. patents U.S. Pat. Nos. 5,603,858 and 5,786,643, discussed above and incorporated herein. However, the present heat retentive servers may also be used in conjunction with modified activation units that utilize a lesser amount of inductive power, but which require a corresponding increase in the activation time.

While we have shown and described several embodiments in accordance with our invention, it is to be clearly understood that the same are susceptible to numerous changes apparent to one skilled in the art. Therefore, there is no wish to be limited to the details shown and described, but intend to show all the changes and limitations which come within the scope of the appended claims.

What is claimed is:

1. A transportable heat retentive server comprising:
   an outer peripheral member having connected thereto;
   a central portion having a heat storage member susceptible to heating by induction wherein the heat retentive server is resistant to chemical degradation resulting from contact with surfactants;
   further comprising a first sealant cavity and a second sealant cavity, wherein said first sealant cavity is disposed between said central portion and said upper peripheral member and said second sealant cavity is disposed between said central portion and lower peripheral member, and said first sealant cavity and said second sealant cavity have therein a sealant compound.

2. The transportable heat retentive server of claim 1, wherein said outer peripheral member is formed from polypropylene.

3. The transportable heat retentive server of claim 2, wherein said outer peripheral member comprises an upper peripheral member and a lower peripheral member.

4. The transportable heat retentive server of claim 1, wherein said sealant compound comprises nitrile with a durometer of between about 30 to 70.

5. The transportable heat retentive server of claim 4, wherein said nitrile has a durometer of at least 50.

6. The transportable heat retentive server of claim 1, wherein said central portion further comprises an upper member and a lower member, and said heat storage member is disposed between said upper member and said lower member.

7. The transportable heat retentive server of claim 6, wherein said central portion further comprises a heat directing layer disposed between said heat storage member and said lower member.

8. The transportable heat retentive server of claim 7, wherein said heat directing layer comprises fiberglass.

9. The transportable heat retentive server of claim 1, wherein said upper peripheral member has a lower annular groove and said lower peripheral member has an upper annular ridge and said upper annular ridge nests within and cooperates with said lower annular groove.

10. The transportable heat retentive server of claim 9, wherein said lower annular groove is welded to said upper annular ridge.

11. The transportable heat retentive server of claim 9, wherein said upper member has an internal surface with a first central annular ridge and a second central annular ridge forming a central annular groove therebetween, and said lower member has a third central annular ridge extending therefrom that cooperates with and nests within the central annular groove.

12. The heat retentive server of claim 11, wherein said third central annular ridge is welded to said central annular groove.

13. The transportable heat retentive server of claim 6, wherein said lower member an internal surface having a plurality of force dissipating members extending substantially perpendicularly therefrom, said heat directing layer has a plurality of apertures, and each of said plurality of apertures accommodates a corresponding force dissipating member.

14. A plurality of heat transportable heat retentive servers according to claim 1, wherein each outer peripheral member of each of said plurality of heat transportable servers further comprises a lower extension, and wherein a first lower extension of a first of said plurality said transportable heat retentive server rests upon a second upper peripheral member of a second of said plurality of heat retentive servers when in a stacked relationship to one another.

15. The transportable heat retentive server of claim 2, wherein said central portion further comprises a pressure release valve.

\* \* \* \* \*